(12) United States Patent
Ishijima et al.

(10) Patent No.: US 7,137,895 B2
(45) Date of Patent: Nov. 21, 2006

(54) TRIPOD TYPE CONSTANT VELOCITY JOINT

(75) Inventors: Minoru Ishijima, Shizuoka-ken (JP);
Kenta Yamazaki, Shizuoka-ken (JP);
Junichi Izumino, Shizuoka-ken (JP)

(73) Assignee: NTN Corporation, Osaka (JP)

( * ) Notice: Subject to any disclaimer, the term of this patent is extended or adjusted under 35 U.S.C. 154(b) by 77 days.

(21) Appl. No.: 10/689,520

(22) Filed: Oct. 21, 2003

(65) Prior Publication Data
US 2004/0157667 A1    Aug. 12, 2004

(30) Foreign Application Priority Data

| | | |
|---|---|---|
| Oct. 25, 2002 | (JP) | 2002-311433 |
| Nov. 12, 2002 | (JP) | 2002-328714 |
| Feb. 24, 2003 | (JP) | 2003-045955 |

(51) Int. Cl.
*F16D 3/205* (2006.01)

(52) U.S. Cl. .................... 464/111; 464/905

(58) Field of Classification Search ............... 464/111, 464/905
See application file for complete search history.

(56) References Cited

U.S. PATENT DOCUMENTS

| | | | |
|---|---|---|---|
| 4,417,880 A * | 11/1983 | Kumagai et al. | ........... 464/111 |
| 5,167,583 A | 12/1992 | Bensinger et al. | ......... 464/111 |
| 5,391,013 A | 2/1995 | Ricks et al. | .................. 403/59 |
| 5,474,500 A | 12/1995 | Girguis | ...................... 464/111 |
| 5,538,473 A * | 7/1996 | Busch et al. | ................ 464/111 |
| 5,571,047 A | 11/1996 | Stall et al. | ................... 464/111 |
| 5,591,085 A | 1/1997 | Stall et al. | |
| 6,454,655 B1 * | 9/2002 | Kudo et al. | ................ 464/111 |
| 2001/0046899 A1 | 11/2001 | Sugiyama et al. | .......... 464/111 |
| 2002/0115491 A1* | 8/2002 | Sams et al. | ................. 464/111 |

FOREIGN PATENT DOCUMENTS

| | | |
|---|---|---|
| DE | 92 18 285 | 5/1994 |
| EP | 1 225 359 A1 | 7/2002 |

* cited by examiner

*Primary Examiner*—Greg Binda
(74) *Attorney, Agent, or Firm*—Arent Fox PLLC

(57) ABSTRACT

Tripod type constant velocity joint has a hollow cylindrical housing fixed to the end of a first shaft and has axially extending recessed grooves opened at one axial end and located at circumferentially trisectional positions on an inner peripheral surface. A tripod has a boss fixed to the end of a second shaft with end-spherical trunnion journals radially projecting from circumferentially trisectional positions on the boss. Roller assemblies each have an inner roller fitted on the spherical surface of the trunnion journal and an outer roller supported for rotation and axial movement on the inner roller. The outer rollers are received in the recessed grooves and rollable axially of the housing. Each recessed groove has guide surfaces contacting the outer surface of the outer roller. Guide shoulder surfaces guide the outer roller axially of the housing. A relief is locally formed along a forged parting line of the trunnion journal.

4 Claims, 16 Drawing Sheets

TRIPOD TYPE CONSTANT VELOCITY JOINT

BACKGROUND ART

The present invention relates to a tripod type constant velocity joint used for transmission of a rotary force between rotary shafts incorporated in the driving system, for example, of an automobile and non-linearly existing therein.

Tripod type constant velocity joints are in wide use as a kind of constant velocity joint to be incorporated in the driving systems of automobiles. For example, Japanese Patent Laid-Open Publication Sho 62-233522 discloses a tripod type constant velocity joint 1 as shown in FIGS. 15 and 16. This tripod type constant velocity joint 1 comprises a hollow cylindrical housing 3 fixed to the end of a first rotary shaft 2, such as a driving shaft, and a tripod 5 fixed to the end of a second rotary shaft 4, such as the rotary shaft on the wheel side.

The inner peripheral surface of the housing 3 is formed, at circumferentially trisectional positions, with recessed grooves 6 extending axially of the housing 3. On the other hand, the tripod 5 comprises a boss 7 to be fixed to the end of the second rotary shaft 4, and columnar trunnion journals 8 radially projecting from the circumferential trisectional positions on the boss 7. Each trunnion journal 8 supports a roller 9 for rotation and more or less axial displacement through needle rollers 10. And these rollers 9 are fitted in the recessed grooves 6 in the housing 3, thereby constituting the tripod type constant velocity joint 1. In addition, a pair of guide surfaces 6a defining each recessed groove 6 are each an arcuately recessed surface, and each roller 9 is supported for rolling and swinging between these guide surfaces 6a.

During the use of the tripod type constant velocity joint 1 constructed as described above, when, for example, the first rotary shaft 2 is rotated, its rotary force is transmitted from the housing 3 to the boss 7 of the tripod 5 successively through the rollers 9, needle rollers 10, and trunnion journals 8, rotating the second rotary shaft 4. Further, when the center axis of the first rotary shaft 2 is out of alignment with the center axis of the second rotary shaft 4, that is, when the tripod type constant velocity joint 1 takes an operating angle, with the rotation of the two rotary shafts 2 and 4, each trunnion journal 8 is displaced in a direction to swing around the axis of the tripod 5 with respect to the guide surfaces 6a of the corresponding recessed groove 6, as shown in FIGS. 15 and 16. At this time, the roller 9 supported by each trunnion journal 8 rolls on the guide surfaces 6a of the recessed groove 6 while being displaced axially of the trunnion journal 8. These movements secure equality of velocity between the first and second rotary shafts 2 and 4.

In the case of the tripod type constant velocity joint 1 constructed to act in the manner described above, when the first and second rotary shafts 2 and 4 are rotated with an operating angle taken, each roller 9 performs a complicated motion. That is, each roller 9 moves along the guide surfaces 6a while changing its direction axially of the housing 3 and is displaced axially of the trunnion journal 8. When each roller performs such complicated motion, relative displacement between the outer periphery surface of each roller 9 and the guide surfaces 6a is not necessarily smoothly effected, so that relatively large friction is generated between these surfaces. As a result, in the case of the tripod type constant velocity joint of the construction shown in FIGS. 15 and 16, a tertiary axial force is generated per revolution. And it is known that a vibration called shudder is generated in remarkable cases as when it is incorporated into an automobile to transmit a large torque with a large operating angle taken.

As measures against the above problem, French Patent No. 2752890 discloses a construction as shown in FIG. 17a and Japanese Patent Laid-Open Publication Heisei 3-172619 discloses a construction as shown in FIG. 19. The construction of FIG. 17a is such that a roller assembly (inner and outer rollers relatively rotatable through needle rollers) is parallelly guided in a recessed groove in the housing and such that centering and swinging are made possible between the spherical inner peripheral surface of the inner roller and the spherical trunnion journal, and spherical fitting is ensured in that the generating line of the outer peripheral surface of the spherical trunnion journal is an arc having a radius of curvature, $r_T$, smaller than the radius (A/2) of the trunnion journal. In this case, the major diameter of a contact ellipse generated under a load torque between the inner roller spherical inner peripheral surface and the spherical trunnion journal becomes longer. Increasing a spherical surface clearance $\{(C-A)/2\}$ makes spherical fitting possible without having to make the radius of curvature, $r_T$, smaller than A/2. In that case, however, not only does the rotation-directional play become larger but also the contact area becomes smaller, resulting in a disadvantage leading to rotation durability decreasing with increasing contact surface pressure.

With the construction of FIG. 19, since a torque load is imposed between the cylindrical inner peripheral surface 20 of the inner roller and the spherical trunnion journal 8, the contact surface area further decreases, resulting in a disadvantage leading to rotation durability decreasing with increasing contact surface pressure. Further, the width (corresponding to the contact ellipse minor diameter) of the contact surface further decreases and the circumferential contact length corresponding to the major diameter further increases. The contact surface pressure is also high.

In these prior art tripod type constant velocity joints, a swing slip that takes place on the contact ellipse due to the swing of the trunnion journal when the joint is rotating under a load with an operating angle taken acts, as shown in FIG. 18, as a spin moment tending to change the rolling direction of the roller assembly, so that the roller assembly has its direction changed until it contacts the guide surfaces of the recessed groove in the housing, and the contact force becomes greater. Further, since it is no longer parallel with the recessed groove in the housing, it is thought that smooth rolling is impeded and the rolling resistance cannot be fully reduced.

A main object of the invention is to provide a tripod type constant velocity joint that has solved the above problems. That is, the invention is intended to provide a tripod type constant velocity joint wherein while holding small the clearance between the spherically surface-fitting inner roller and spherical trunnion journal, that is, holding the rotation-directional play small, spherical fitting (surface pressure reduced) is made possible and the contact ellipse major diameter is reduced so as to keep small the spin moment generated by the swing of the trunnion journal, so as to minimize the rolling resistance in the roller assembly during the rolling with an operating angle taken, thereby ensuring the coexistence of reduced shudder and high durability when the joint is assembled to an automobile.

DISCLOSURE OF THE INVENTION

According to an embodiment of the invention, a tripod type constant velocity joint comprises a hollow cylindrical housing fixed to the end of a first rotary shaft and formed with axially extending recessed grooves opened at one axial end and located at circumferentially trisectional positions on the inner peripheral surface, a tripod consisting of a boss fixed to the end of a second rotary shaft, and end-spherical trunnion journals radially projecting from circumferentially trisectional positions on the boss, roller assemblies each consisting of an inner roller swingably fitted at the inner peripheral surface thereof on the spherical outer peripheral surface of the trunnion journal, and an outer roller supported for rotation and axial movement on the outer peripheral surface of the inner roller through needle rollers, wherein the outer rollers are received in the recessed grooves in the housing and are rollable axially of the housing, each recessed groove consists of guide surfaces contacting the outer peripheral surface of the outer roller and subjected to loads, and guide shoulder surfaces for guiding the outer roller axially of the housing, and only the side of the outer diameter of said boss associated with the end of the second rotary shaft is heavily chamfered. This embodiment is arranged so that during assemblage by tilting the roller until the projected shorter radius of the trunnion journal (in a direction at right angles with the load-subjected side) is reduced to not more than its inner diameter at its end on the inner roller fitting side, the roller does not interfere with the boss of the tripod (journal underhead). Since torque transmission between the tripod and the second rotary shaft is effected mostly by the second rotary shaft non-end side in the boss, heavily chamfering the boss at the second rotary shaft end does not lead to a lowering in the boss strength. Mounting this tripod type constant velocity joint on a vehicle makes it possible to reduce the vibration of the vehicle and to ensure coexistence of high strength and durability.

The load-subjected position (contact ellipse center position) on the spherical outer peripheral surface of the trunnion journal may be provided with a flat surface or dent of suitable size. The flat surface or dent is located in the region inwardly receding from the spherical outer peripheral surface of the trunnion journal and has an optional size within a range where the contact area decreases, for example, to ⅕ of the contact area due to spherical fitting without such flat surface or dent. There is almost no relative displacement in the center of the region of spherical contact between the trunnion journal and the inner roller, in which poor lubrication could occur, and smearing measures can be taken by providing said flat surface or dent so as to avoid contact in said region.

At least one end of the inner peripheral surface of the outer roller may be integrally formed with a needle roller retainer. Thus, by forming the outer roller integrally with an inner needle roller retainer and an outer needle roller retainer, it is possible to constitute a roller assembly by only three elements, the inner roller, needle rollers and outer roller, reducing the number of parts. In this case, the relation Di<do can be established where Di is the inner diameter of the cylindrical inner peripheral surface of the outer roller at the joint inner diameter side end and do is the outer diameter of the inner roller. Adopting such arrangement makes it difficult for the outer roller to be detached from the inner roller in the state of the tripod kit (a unit consisting of the tripod and the roller assembly), making handling easy.

At least one end of the outer peripheral surface of the inner roller may be integrally formed with a needle roller retainer. By forming the inner roller integrally with an inner needle roller retainer and an outer needle roller retainer, it is possible to constitute a roller assembly by only three elements, the inner roller, needle rollers and outer roller, reducing the number of parts. In this case, the relation Di<do can be established where do is the outer diameter of the cylindrical outer peripheral surface of the inner roller at the joint inner diameter side end and Di is the inner diameter of the outer roller. Adopting such arrangement makes it difficult for the outer roller to be detached from the inner roller in the state of the tripod kit, making handling easy.

According to another embodiment, a tripod type constant velocity joint comprises a hollow cylindrical housing fixed to the end of a first rotary shaft and formed with axially extending recessed grooves opened at one axial end and located at circumferentially trisectional positions on the inner peripheral surface, a tripod consisting of a boss fixed to the end of a second rotary shaft, and end-spherical trunnion journals radially projecting from circumferentially trisectional positions on the boss, roller assemblies each consisting of an inner roller swingably fitted at the inner peripheral surface thereof on the spherical outer peripheral surface of the trunnion journal, and an outer roller supported for rotation and axial movement on the outer peripheral surface of the inner roller through needle rollers, wherein the outer rollers are received in the recessed grooves in the housing and are rollable axially of the housing, each recessed groove consists of guide surfaces contacting the outer peripheral surface of the outer roller and subjected to loads and guide shoulder surfaces for guiding the outer roller axially of the housing, and a relief is locally formed along the forged parting line of the trunnion journal, thereby receding the protuberance of the forged parting line inwardly from the outer peripheral surface of the trunnion journal. Providing a relief results in the protuberance of the forged parting line not projecting beyond the outer peripheral surface of the trunnion journal, thus making it possible to effect spherical fitting surface contact between the inner roller and the trunnion journal without the operation of removing the protuberance of the forged parting line, and the surface pressure lowers. Therefore, it is possible to provide a tripod type constant velocity joint ensuring the coexistence of reduced shudder with the joint assembled to a vehicle, high durability and cost reduction.

The cross-section of the trunnion journal in the torque load region may be substantially double spherical. In that case, the parting line position on the trunnion journal recedes from the inner spherical surface of the inner roller toward the minor diameter side, so that a relief is formed without taking special measures. In a torque-loaded state, the contact regions between the trunnion journal and the inner roller are located in two positions symmetrical with respect to the forged parting line of the trunnion journal, but their abutment occurs in their spherical surfaces, so that there is no danger of edge loading. As a concrete embodiment of said substantially double spherical shape, an example may be mentioned in which the radius R of the double spherical surface of the trunnion journal is set so that $r/2<R<r$ where r is the radius of curvature of the spherical inner peripheral surface of the inner roller.

Let $\theta$ be the angle at which the roller assembly is tilted when assembled to the trunnion journal. Then, by setting the maximum diameter $\phi D$ of the trunnion journal (including the forged parting line) projected in the direction of angle $\theta$ not more than the inner diameter $\phi d$ of the inner roller on the insertion side, it is possible to assemble the roller assembly to the trunnion journal without elastically deforming the inner roller during incorporation. Therefore, according to this embodiment, it becomes possible to omit the forged parting line removing step and the force fitting step required for assembling the roller assembly to the trunnion journal. Further, a notch may be locally formed in the inner diameter of the inner roller on the insertion side, and the setting may be such that $\phi D_2 < \phi d_2$ where $\phi d_2$ is the inner diameter of the notch and $\phi D_2$ is the maximum diameter of the trunnion journal (including the forged parting line) projected in the direction of angle $\theta$.

The setting may be such that with $\theta_1$ being the angle at which the roller assembly is about to separate from the trunnion journal, the roller assembly interferes with the rotary shaft when it is tilted up to an angle $\theta_2$ ($\theta_2 < \theta_1$) after the rotary shaft has been mounted in a tripod kit. Herein, a unit consisting of a tripod and roller assemblies is termed a tripod kit. Further, the term "rotary shaft" shall include not only the rotary shaft itself but also a separate member, such as a stop ring, attached to the rotary shaft. Employing such arrangement ensures that in the state of the unit consisting of the tripod and roller assemblies, that is, tripod kit, the tripod is assembled to the second rotary shaft, and once a stop ring is mounted, the inner roller interferes with the stop ring or the rotary shaft and cannot tilt up to the angle $\theta_1$ at which it separates from the trunnion journal, so that the tripod kit and the rotary shaft assume a unit handling state, which greatly facilitates handling.

According to another embodiment of the invention, a tripod type constant velocity joint comprises a hollow cylindrical housing fixed to the end of a first rotary shaft and formed at the inner peripheral surface thereof with axially extending recessed grooves opened at one axial end and located at circumferentially trisectional positions on the inner peripheral surface, a tripod consisting of a boss fixed to the end of a second rotary shaft, and end-spherical trunnion journals radially projecting from circumferentially trisectional positions on the boss, roller assemblies each consisting of an inner roller swingably fitted at the inner peripheral surface thereof on the spherical outer peripheral surface of the trunnion journal, and an outer roller supported for rotation and axial movement on the outer periphery of the inner roller through needle rollers, wherein the outer rollers are received in the recessed grooves in the housing and are rollable axially of the housing, each recessed groove consists of guide surfaces contacting the outer peripheral surface of the outer roller and subjected to loads, and guide shoulder surfaces for guiding the outer roller axially of the housing, it being arranged that when the roller assembly is to be assembled to the trunnion journal, it is done so by tilting the roller assembly axially of the joint, the root of the tripod journal being of non-circular cross-section in which the diameter measured circumferentially of the joint is larger than the diameter measured axially of the joint. As for a non-circular shape in which the diameter measured circumferentially of the joint is larger than the diameter measured axially of the joint, there may be mentioned, for example, an elliptic shape with its minor axis directed axially of the joint. Assembling the roller assembly to the trunnion journal by tilting it in a plane including the direction of the axis of the joint makes it essential only that the interference-avoiding relief for assembling the journal underhead and the roller to each other be present only on the side of the journal underhead as seen axially of the joint, so that the interference-avoiding relief for assemblage on the side thereof as seen circumferentially of the joint becomes unnecessary. In the case of such design specification, since there is no interference-avoiding relief in the underhead circumferential position tending to be the maximum stress position when subjected to torque load, strength improvement becomes possible and it is possible to provide a more compact joint.

These and other objects and arrangements of the invention will become more apparent from the following description to be given with reference to the accompanying drawings.

BRIEF DESCRIPTION OF THE DRAWINGS

FIG. 1b is a partial enlarged view of FIG. 1a;

FIG. 2 is a longitudinal sectional view of the tripod type constant velocity joint of FIG. 1a;

FIG. 9c is an enlarged view of the area C of FIG. 9a.

FIG. 12b is a sectional view taken along the line b—b in FIG. 12a;

FIG. 14b is a view taken in the direction of arrow Y in FIG. 14a;

FIG. 17b is a cross-sectional view of the trunnion journal in FIG. 17a;

BEST MODE FOR EMBODYING THE INVENTION

An embodiment of the invention will now be described with reference to the drawings.

Figure 1A:
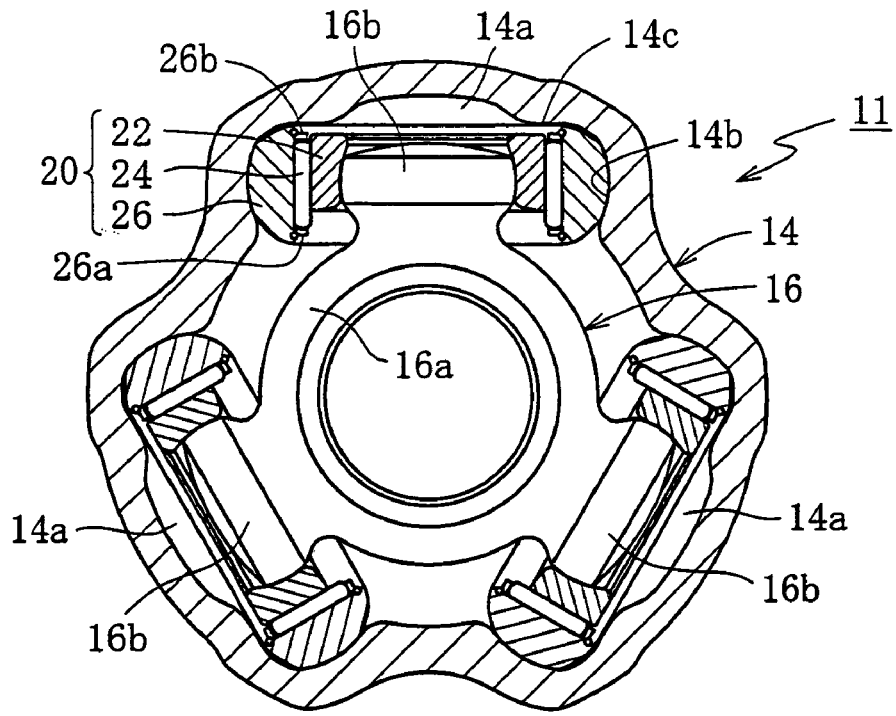
FIG. 1a is a cross-sectional view of a tripod type constant velocity joint showing an embodiment of the invention.
Figure 1B:
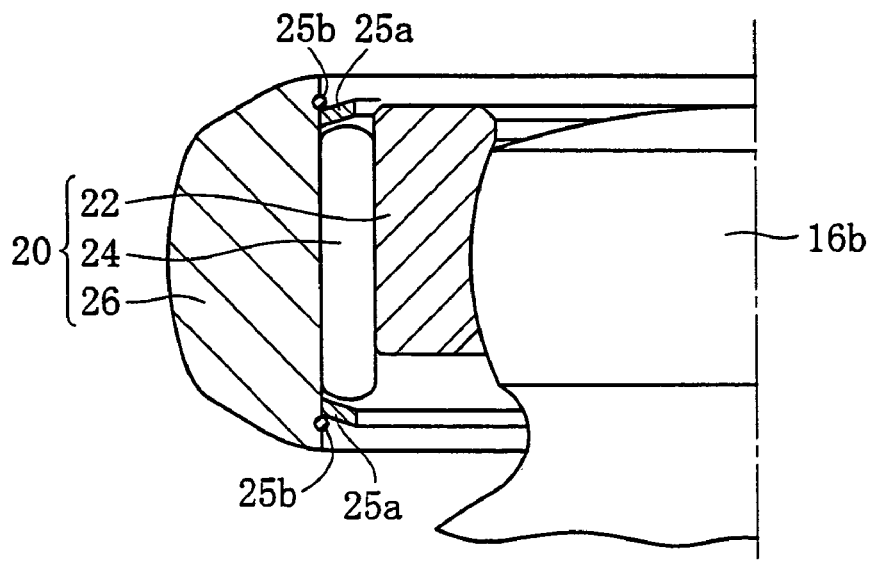
Figure 2:
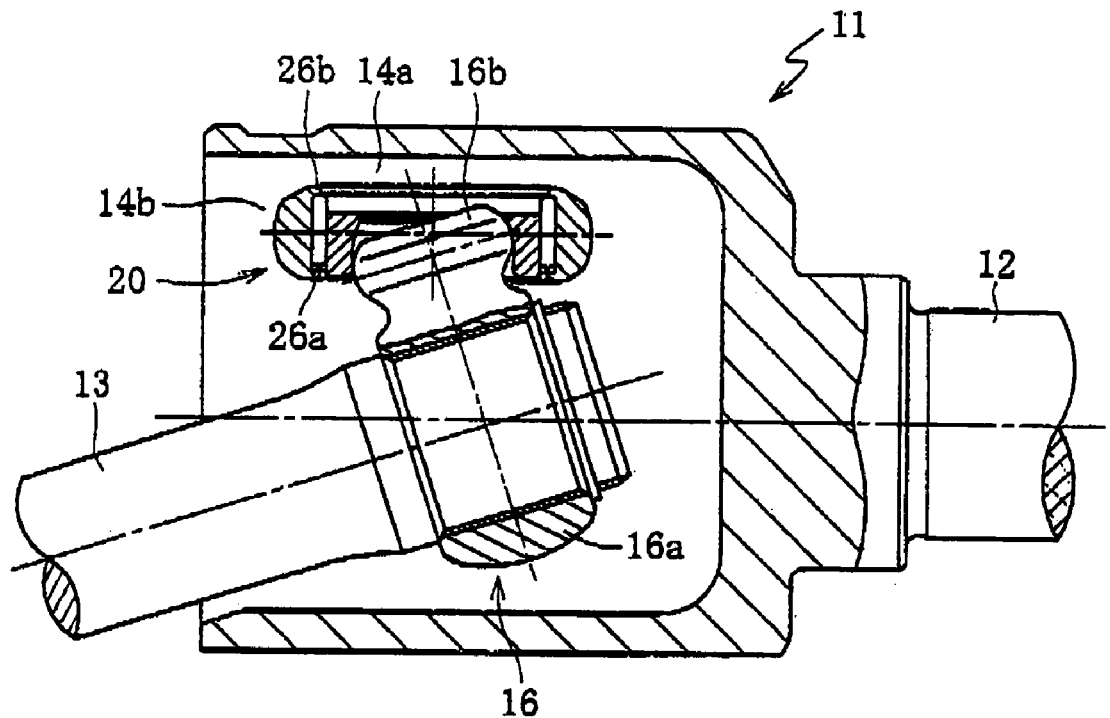
Figure 15:
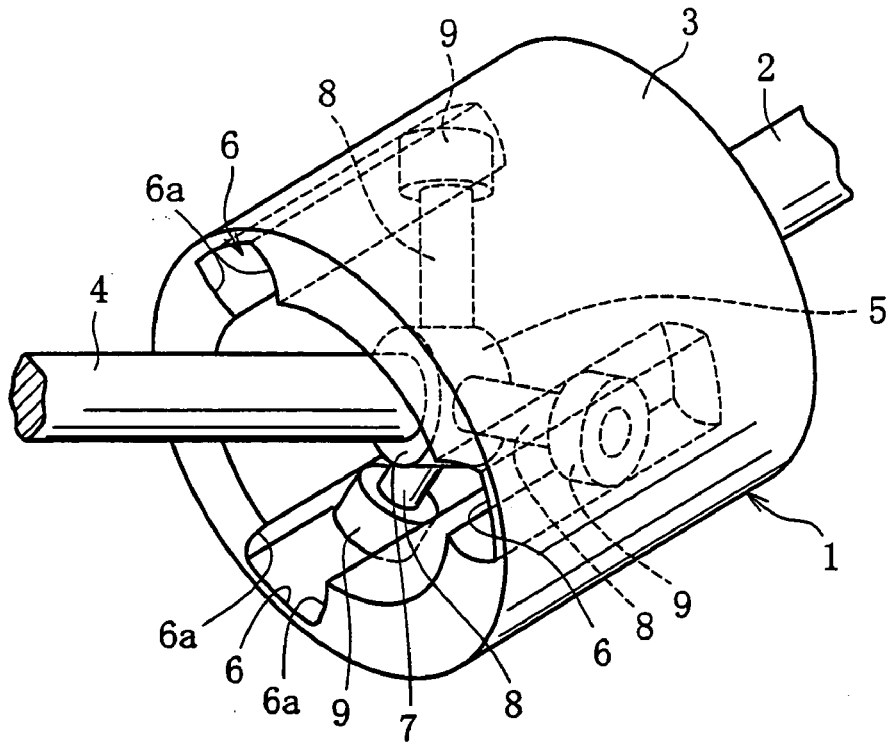
FIG. 15 is a perspective view of a tripod type constant velocity joint, showing the prior art.
Figure 16:
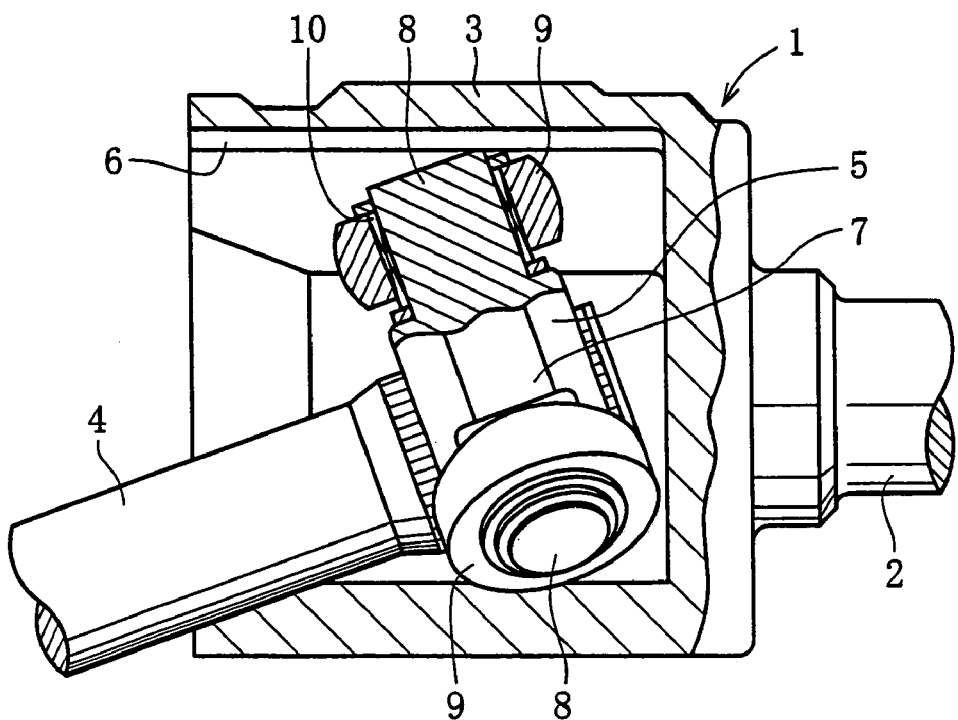
FIG. 16 is a longitudinal sectional view of the tripod type constant velocity joint of FIG. 15.

First, referring to FIGS. 1a, 1b and 2, a tripod type constant velocity joint 11 is no different from the one shown in FIGS. 15 and 16 described previously, as far as the basic arrangement is concerned, comprising a hollow cylindrical housing 14 fixed to the end of a first rotary shaft 12, such as a driving shaft, and a tripod 16 fixed to the end of a second rotary shaft 13, such as the rotary shaft on the wheel side.

The housing 14, herein, is formed integrally with the first rotary shaft 12, and has axially extending recessed grooves 14a at circumferentially trisectional positions on the inner peripheral surface. Each recessed groove 14a is recessed to extend radially outward from the inner peripheral surface of the housing 14, and is composed of a pair of circumferentially opposed guide surfaces 14b and a bottom surface positioned on the radially outside of the housing and connecting the two guide surfaces 14b. The pair of guide surfaces 14b provide a raceway for guiding an outer roller 26, to be later described, axially of the housing for rolling therein, and torque is transmitted between them and the outer roller 26. Further, part of the bottom surface of the recessed groove 14a is formed with guide shoulder surfaces 14c for guiding the rolling of the outer roller 26. These guide shoulder surface 14c perform the role of maintaining the posture of the outer roller 26 parallel with the housing axis when the outer roller moves in the recessed groove 14a, ensuring smooth rolling.

The tripod 16 comprises a boss 16a and a trunnion journal 16b. The boss 16a is fixed to the end of the second rotary shaft 13. For example, a spline shaft formed in the second rotary shaft 13 and spline holes formed in the boss 16a fit together and are positioned by a stop ring. The trunnion journals 16b project radially from circumferentially trisectional positions on the boss 16a. The end of each trunnion journal 16b is spherical.

Each trunnion journal 16b supports a roller assembly 20. The roller assembly 20 is of a double roller type consisting of an inner roller 22 and an outer roller 26 that are relatively turnable through needle rollers 24. The inner peripheral surface of the inner roller 22 is a partial spherical inner peripheral surface having substantially the same radius of curvature as that of the spherical outer peripheral surface of the trunnion journal 16b. The spherical inner peripheral surface of the inner roller 22 is oscillably supported around the periphery of the spherical outer peripheral surface of the trunnion journal 16b.

Needle rollers 24 are interposed between the cylindrical outer peripheral surface of the inner roller 22 and the cylindrical inner peripheral surface of the outer roller 26. Therefore, the inner and outer rollers 22 and 26 are capable of relative rotation and axial movement. In order to prevent slipping-off of the needle rollers 24, needle roller retainers 26a and 26b are installed throughout the circumference on both edge ends of the cylindrical inner peripheral surface of the outer roller 26. As an example of a needle roller retainer, there is shown a case in FIG. 1a, using a retainer 25a separate from the outer roller 26, and a stop ring 25b, and FIG. 2 shows another case where a retainer is integral with the outer roller 26. As shown in FIG. 1b, which is a partial enlarged view of FIG. 1a, annular retainers 25a are installed on both end sides of the needle rollers 24, and stop rings 25b are mounted in stop ring grooves formed in the inner peripheral surface of the outer roller 26 at both ends.

The outer rollers 26 are received in the recessed grooves 14a in the housing 14. A pair of guide surfaces 14b defining each recessed groove 14a each form substantially the same arc, in the cross-section of the housing 14, as the generating line of the outer peripheral surface of the outer roller 26. Therefore, the outer roller 26 is rollably supported between these two guide surfaces 14b.

During the use of the constant velocity joint constructed in the manner described above, for example, when the first rotary shaft 12 is rotated, the rotary force thereof is transmitted from the housing 14 to the boss 16a of the tripod 16 through the roller assemblies 20 (22, 24, 26) and the trunnion journals 16b to rotate the second rotary shaft 13. Further, in the case where the center axes of the first and second rotary shafts 12 and 13 are out of alignment with each other, in other words, they take an operating angle therebetween, with the rotation of the two rotary shafts each trunnion journal 16b is displaced in a direction to swing around the axis of the tripod 16 with respect to the guide surfaces 14b of the corresponding recessed groove 14a. At this time, the outer roller 26 of the roller assembly supported by each trunnion journal 16b rolls on the guide surfaces 14b of the recessed groove 14a while being displaced axially of the trunnion journal 16b. These movements, as is known in the art, secure equality of velocity between the first and second rotary shafts.

Figure 3:
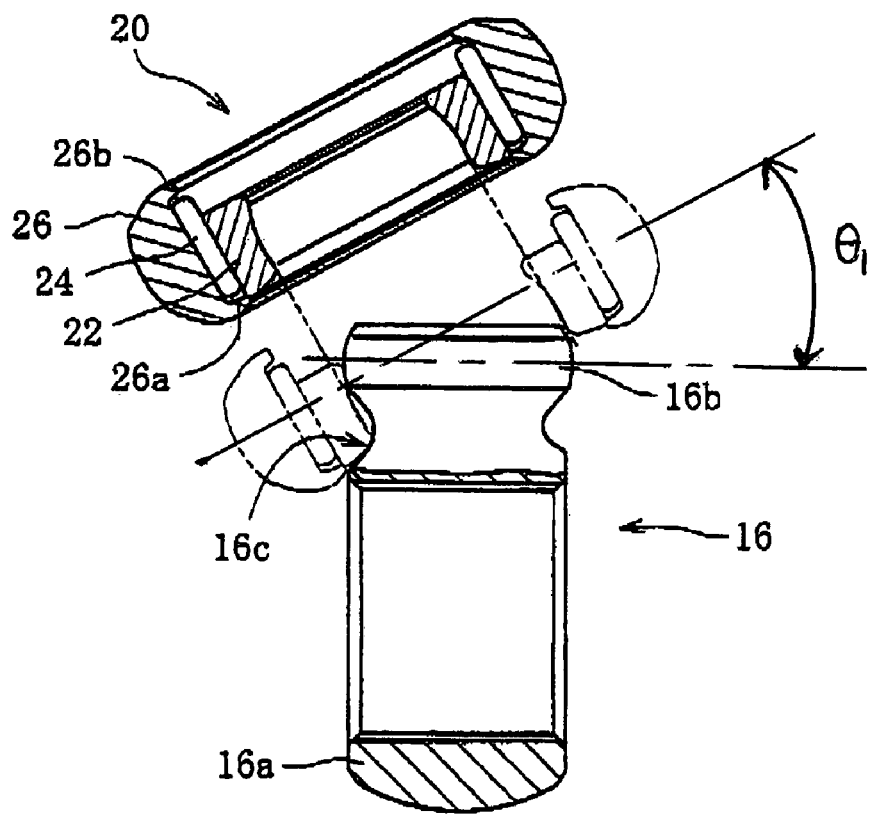
FIG. 3 is an exploded sectional view of a tripod kit, illustrating how to assemble a roller assembly to a trunnion journal.

As shown at 16c in FIG. 3, the outer diameter of the boss 16a is heavily chamfered at one end surface (the left-hand side end surface in FIG. 3) of the boss 16a of the tripod 16. Thereby, the roller assembly 20 can be greatly tilted when it is to be assembled to the trunnion journal 16b, and since interference is limited to only two opposed places where the trunnion journal 16b is subjected to a load, pushing in the inner roller 20 attended by elastic deformation makes assemblage possible. Flat surfaces may be provided for relief at two positions (outside the loading range) at right angles with the position where the trunnion journal 16b is subjected to a load.

With the above construction, since torque is transmitted between spherical inner peripheral surface of the inner roller 22 and the spherical outer peripheral surface of the trunnion journal 16b, the contact surface pressure is kept low, which is advantageous from the standpoint of strength and durability, making it possible to keep the major diameter of the contact ellipse relatively small without increasing rotation-directional play, and to decrease the spin moment on the contact ellipse generated with the swing of the trunnion journal. Therefore, it is possible to avoid more contact than is necessary between the recessed groove 14a in the housing 14 and the one guide surface 14c, and the rolling direction of the roller assembly 20 is stabilized, so that it becomes possible to provide a joint wherein the rolling resistance in the roller assembly 20 is low and so is the axial force. As described above, it becomes possible to provide a tripod type constant velocity joint ensuring the coexistence of low rolling resistance in the roller assembly and high strength and high durability.

Figure 4A:
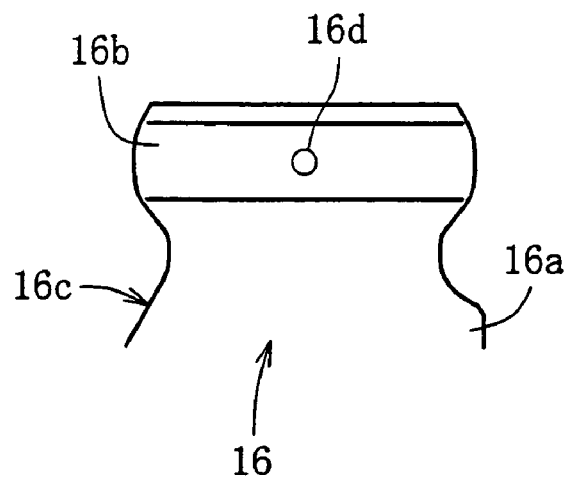
FIGS. 4a–4c are side views of the trunnion journal.
Figure 4B:
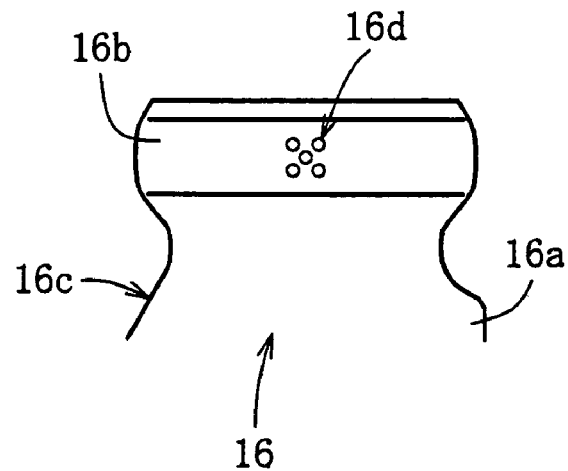
Figure 4C:
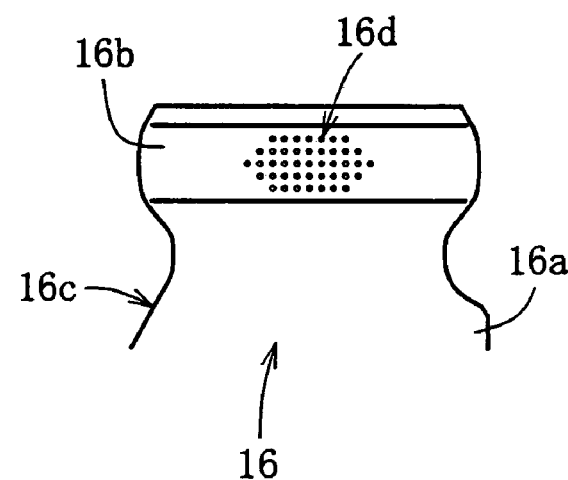

Next, FIGS. 4a–4c show modifications in which flat surfaces or dents 16d are provided at or around the center position where the trunnion journal 16b is subjected to a load. Flat surfaces or dents of optional size are provided in a range where the contact area reduces to ⅕ of the contact area by spherical fitting without flat surfaces or dents. The number of small flat surfaces or dents is not particularly limited. FIG. 4a shows the case of using a single, FIG. 4b shows the case of using four, and FIG. 4c shows the case of using a large number. In the case of providing a plurality, a suitable repetitive pattern or random dispersion may be employed. In the case of the embodiment shown in FIGS. 1a and 2, although the contact stress in the spherical fitting section is small, the amount of relative slip in the center of the contact ellipse is at a minimum, so that in the case of continuous rotation under a load for a long time, poor lubrication takes place, sometimes leading to a lowering in rotation durability. The modifications shown in FIGS. 4a–4c eliminate such drawbacks.

Figure 5A:
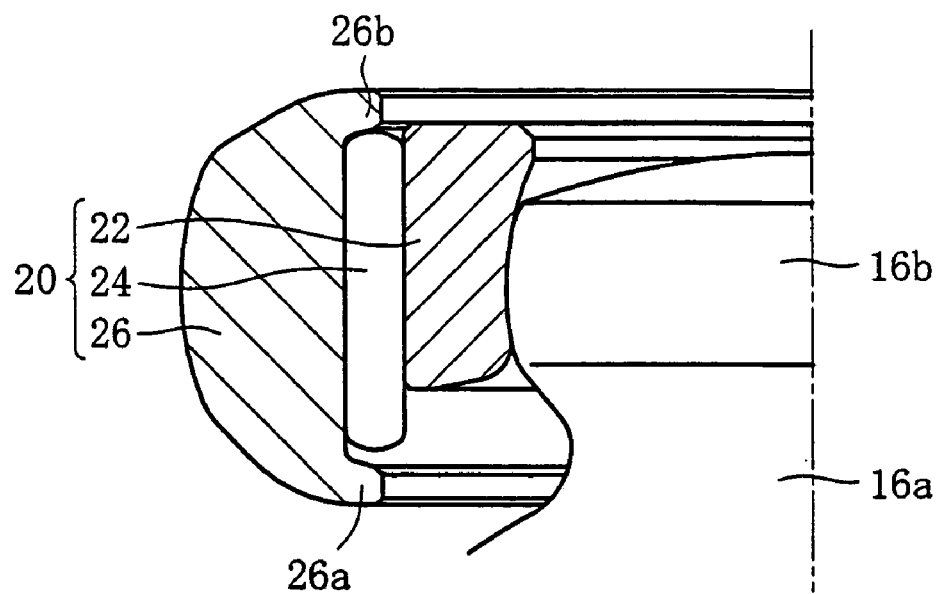
FIGS. 5a and 5b, and FIGS. 6a and 6b are sectional view of the trunnion journal and the roller assembly.

In a modification shown in FIG. 5a, both end edges of the cylindrical inner peripheral surface of the outer roller 26 are formed with projections throughout the periphery to provide integrally formed needle roller retainers 26a and 26b. This produces the effect of reducing the number of parts. That is, as shown, integrally forming the inner needle roller retainer 26a and the outer needle roller retainer 26b on the outer roller 26 makes it possible to constitute the roller assembly by only three bodies, the inner roller 22, needle rollers 24 and outer roller 26. It is also possible, however, to make either the inner needle roller retainer 26a or the outer needle roller retainer 26b integral with the outer roller 26 while using a separate stop ring or the like for the other.

Figure 5B:
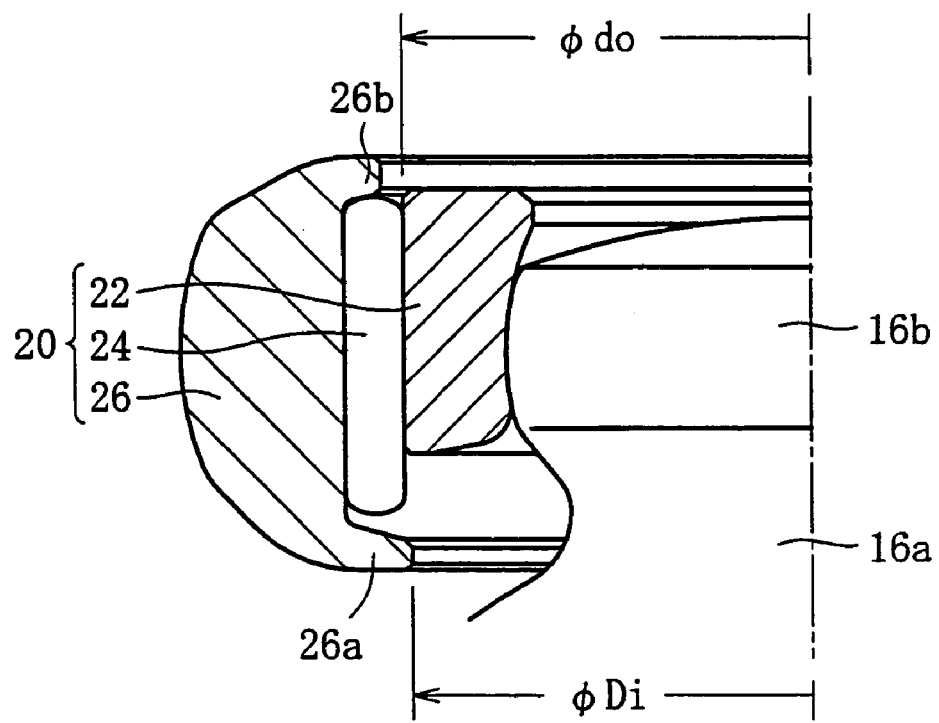

A modification shown in FIG. 5b establishes the relation Di<do where Di is the inner diameter of the inner needle roller retainer 26a on the cylindrical inner peripheral surface of the outer roller 26, i.e., at the joint inner diameter side end, the inner diameter of and do is the outer diameter of the inner roller 22. The relation Di<do ensures that, in the state of the tripod kit, i.e., in the unit state of the tripod 16 and the roller assemblies 20, the outer roller 26 is hardly disassembled from the inner roller 22, and as can be understood from FIG. 1a, even if the outer roller 26 moves downward, it interferes with the boss 16a of the tripod 16 to prevent the needle rollers 24 from disassembling; thus, handling is easy.

Figure 6A:
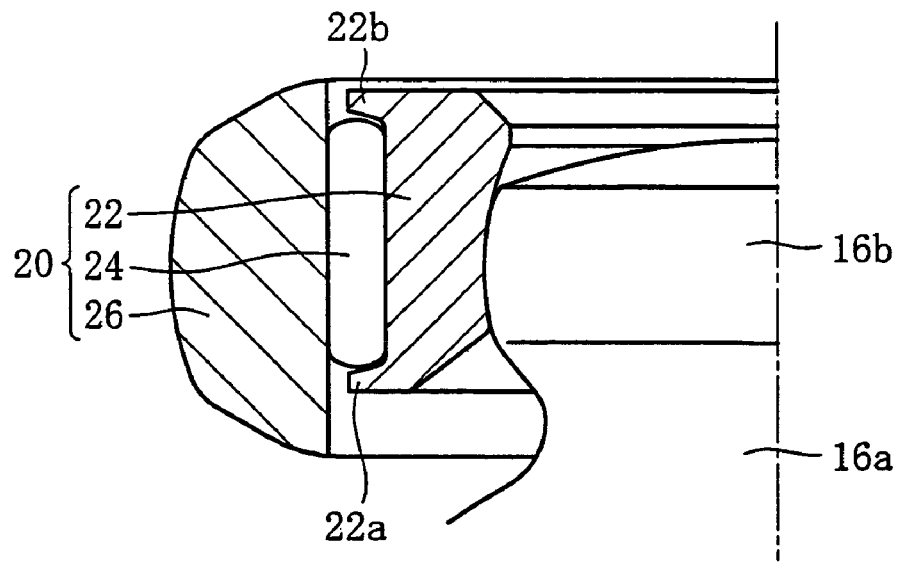

In a modification shown in FIG. 6a, both end edges of the cylindrical outer peripheral surface of the inner roller 22 are provided with projections throughout the circumference to provide integrally formed needle roller retainers 22a and 22b. This produces the effect of reducing the number of parts. That is, as shown, integrally forming the inner needle roller retainer 22a and the outer needle roller retainer 22b on the inner roller 22 makes it possible to constitute the roller assembly by only three bodies, the inner roller 22, needle rollers 24 and outer roller 26. In this case also, it is possible to make either the inner needle roller retainer 22a or the outer needle roller retainer 22b integral with the inner roller 22 while using a separate stop ring or the like for the other.

Figure 6B:
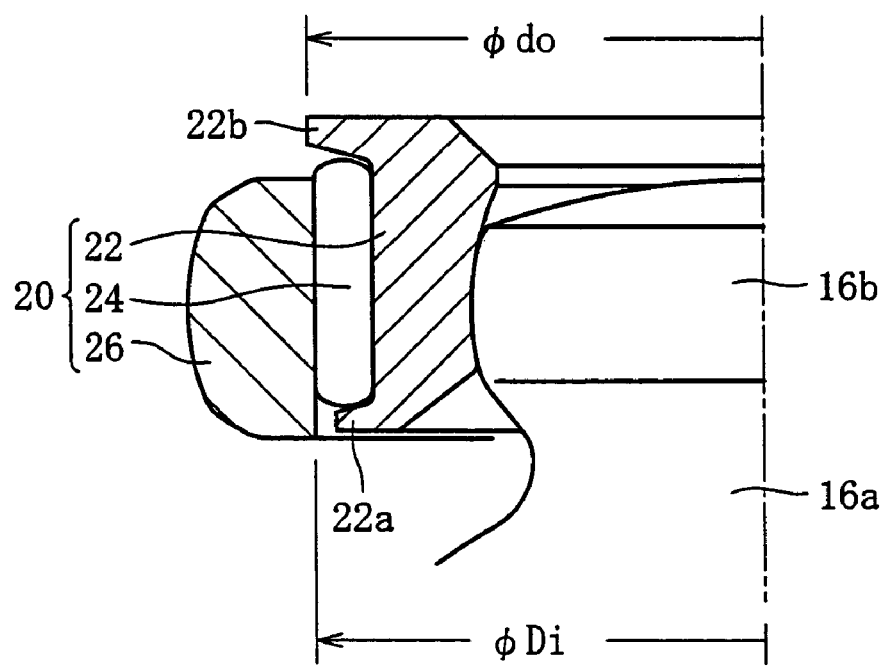

A modification shown in FIG. 6b establishes the relation Di<do where do is the outer diameter of the outer needle roller retainer 22b on the cylindrical outer peripheral surface of the inner roller 22, i.e., the outer diameter of the joint outer diameter side end, and Di is the inner diameter of the outer roller 26. The relation Di<do ensures that, in the state of the tripod kit, the outer roller 26 is hardly disassembled from the inner roller 22, so that handling is easy.

Referring again to FIG. 17a, in the prior art joint shown in this figure, each trunnion journal 8 has two flat portions 8a perpendicular to the axis z of the tripod 5. The radius $r_T$ of the arc generating the spherical outer peripheral surface of the trunnion journal 8 is smaller than the radius of curvature, C/2, of the spherical inner peripheral surface of the inner roller 9a. And the assembling of the inner roller 9a to the trunnion journal 8 is effected by rotating the tripod 5 around the axis z of the inner roller 9a by an angle α at which the inlet diameter B of the inner roller 9a (smaller than the inner diameter C) is larger than or equal to a projection A (α) of the diameter A of the spherical outer peripheral surface of the trunnion journal 8 onto this diameter. In the case of this conventional joint, as shown at 8b in FIG. 17b, since a protuberant forged parting line projecting from the outer diameter surface of the trunnion journal 8 can be positioned in the center of the load surface of the trunnion journal, a removing operation such as grinding is inevitable. In order to provide a tripod type constant velocity joint ensuring the coexistence of reduced shudder with the joint assembled to an automobile, high durability and cost reduction, it is desired that no operation of removing the forged parting line of the trunnion journal be required and that spherical fitting be made possible while holding small the clearance between the spherically surface-fitting inner roller and trunnion journal.

Figure 7B:
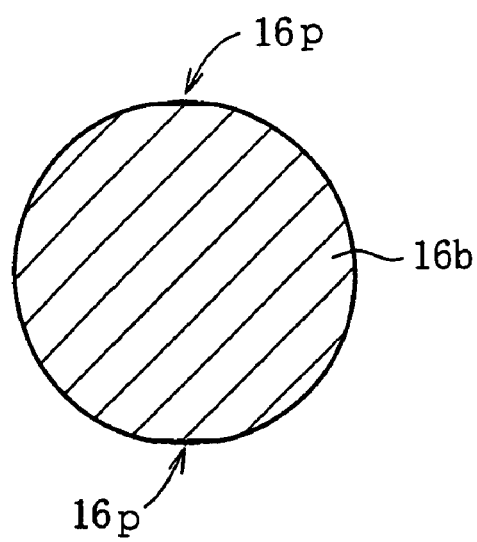
FIG. 7b is a cross-sectional view of the trunnion journal.
Figure 7C:
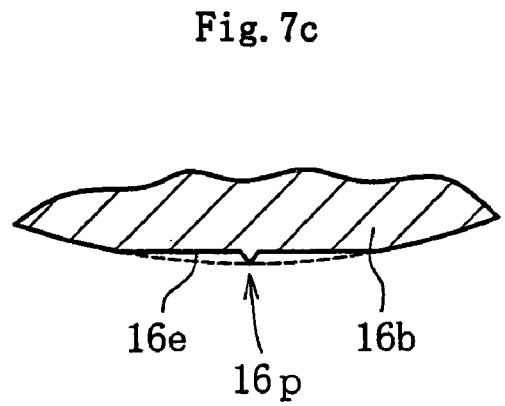
FIG. 7c is an enlarged view of a forged parting line projection of FIG. 7b.
Figure 7A:
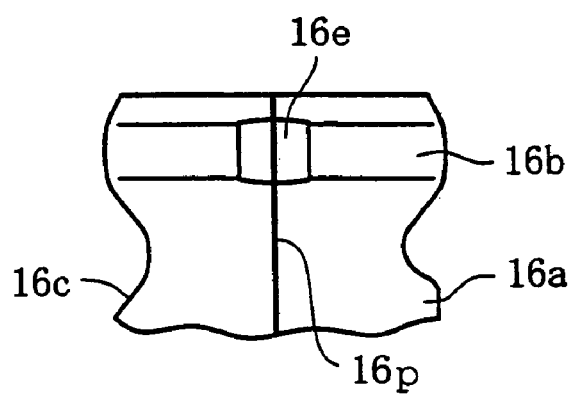
FIG. 7a is a side view of the trunnion journal.

Referring to FIGS. 7a–7c, the outer peripheral surface of the trunnion journal 16b is spherical for spherical fitting to the spherical inner peripheral surface of the inner roller 22, but a relief 16e is partially formed along the forged parting line 16p so that the protuberance of the forged parting line 16p inwardly recedes from the spherical outer peripheral surface so as not to project outward, as shown in broken line in FIG. 7c. Therefore, it becomes possible to dispense with the step of removing the forged parting line 16p, and to use the cold molded surface in its molded state, leading to cost reduction. In this case, the relief 16e portion cannot bear a load and hence the loading area is decreased; however, even if the loading range is partly decreased, a sufficient load capacity can be held because of the type in which the trunnion journal 16b and the inner roller 22 cooperate with each other to bear a load by spherical fitting of wide range. FIGS. 7a–7c exemplify the case where the relief 16e is a flat surface, but a cylindrical surface or some other curved surface may be employed. Further, in the case of providing the relief 16e, as compared with the case of not providing the relief 16e, the effect of reducing the interference margin in assembling the inner roller 22 to the trunnion journal 16b is obtained, and the amount of elastic deformation of the inner roller 22 can be made small or eliminated.

Further, in this construction, the inner roller 22 is spherically surface-fitted on the trunnion journal 16b and is integrally supported axially of the trunnion journal 16b, so that its movement in the direction of the axis of the trunnion journal accompanying rotation with an operating angle taken is allowed by rolling slip on the needle rollers 24 disposed between the inner and outer rollers 22 and 26; therefore, the internal friction force is low and a low rolling resistance in rollers is attained. In the case of the prior art shown in FIG. 17a, when the rollers are to be assembled to the trunnion journal, the rollers are tilted in a plane (corresponding to the plane of FIG. 1a) orthogonal to the plane of FIG. 3. In order to make it possible to greatly tilt the rollers, it is necessary to reduce the outer diameter of the boss, that is, to reduce the thickness of the boss or to prolong the underhead dimension of the trunnion journal. This, however, causes drawbacks that if the outer diameter of the boss is reduced, the boss strength lowers and that if the underhead dimension of the trunnion journal is increased, the joint outer diameter increases. The arrangement of FIGS. 7a–7c avoids such drawbacks and makes it possible to provide a tripod type constant velocity joint ensuring the coexistence of all such factors as low rolling resistance, high strength, high durability, and cost and size reduction for rollers.

Figure 8A:
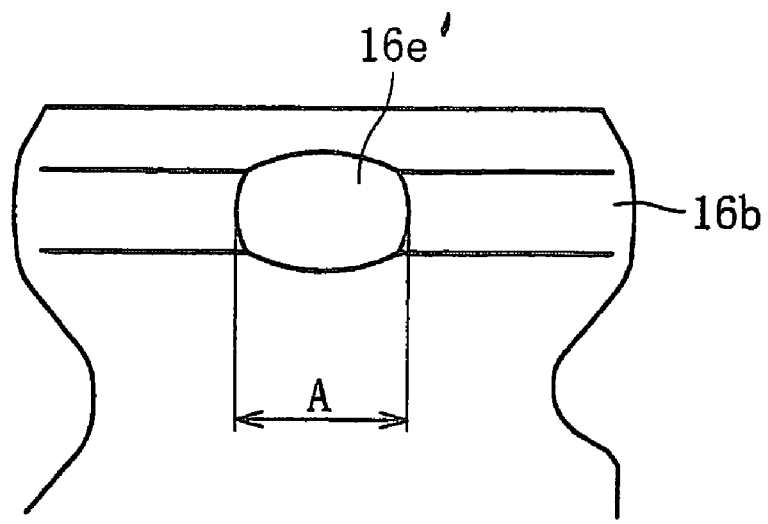
FIG. 8a is a side view of the trunnion journal.
Figure 8B:
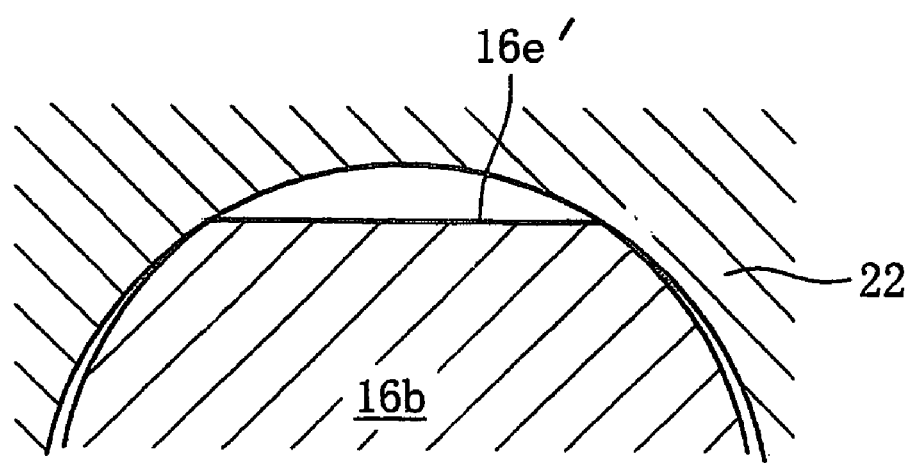
FIG. 8b is a cross-sectional enlarged view of a contact region between the trunnion journal and an inner roller.
Figure 9A:
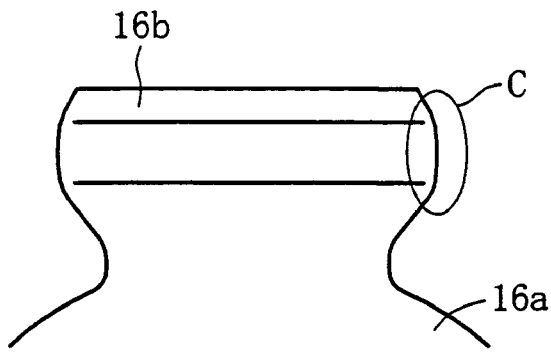
FIG. 9a is a front view of the trunnion journal.
Figure 9B:
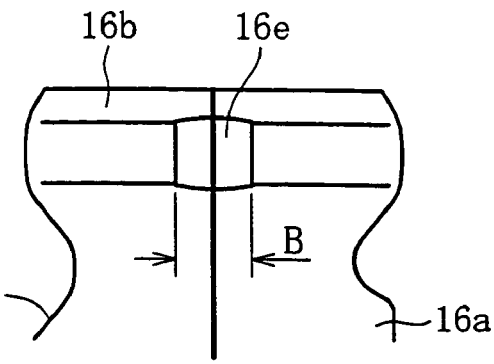
FIG. 9b is a side view of the trunnion journal.
Figure 9C:
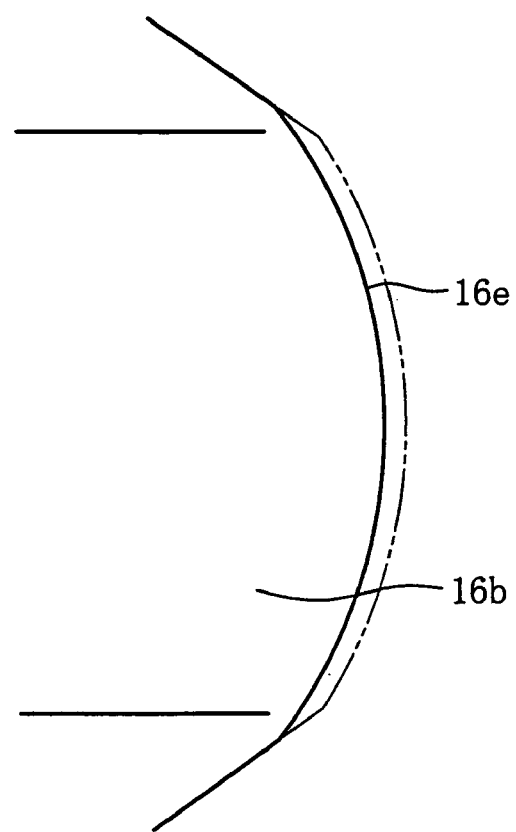

Various concrete forms of the relief 16e may be contemplated. The simplest example is shown in FIG. 8a wherein part of the spherical is removed to provide a flat surface. In the case of providing a relief by simply removing part of the spherical surface, however, the width dimension A of the relief increases and the area to bear the load decreases. Thus, for example, as shown in FIGS. 9a–9c, it is possible to form a relief 16e' assuming an arcuate shape in the longitudinal section of the trunnion journal 16b. In this embodiment, there is an advantage that the width dimension B of the relief is small while the area to bear the load is large. However, both of these embodiments result in a contact state as shown in FIG. 8b, with a concentrated stress occurring in the edge, causing premature spalling. Rounding the edge may sometimes fail to be sufficiently effective.

Figure 10:
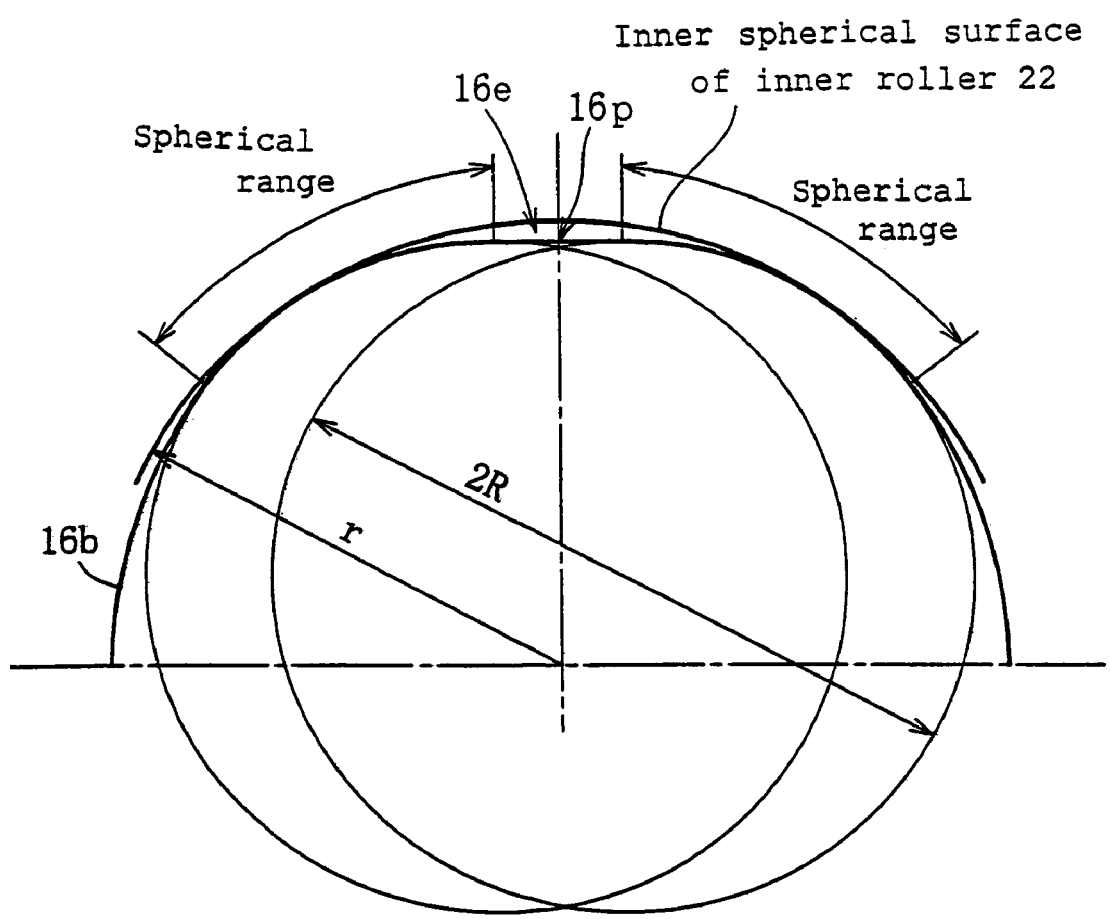
FIG. 10 is a cross-sectional diagram of the contact region between the trunnion journal and the inner roller.

What is shown in FIG. 10 is an arrangement wherein the outer shape of the torque load region of the trunnion journal 16b is substantially double spherical. Concretely, the relation r/2<R<r is established where r is the radius of curvature of the spherical inner peripheral surface of the inner roller 22 and R is the radius of the double spherical surface of the trunnion journal 16b. In this case, the parting line position recedes from the inner spherical surface of the inner roller toward the minor diameter side, so that a relief 16e is formed without taking special measures. In a torque-loaded state, the contact regions between the trunnion journal 16b and the inner roller 22 are located in two positions symmetrical with respect to the forged parting line 16p of the trunnion journal 16b.

Figure 11:
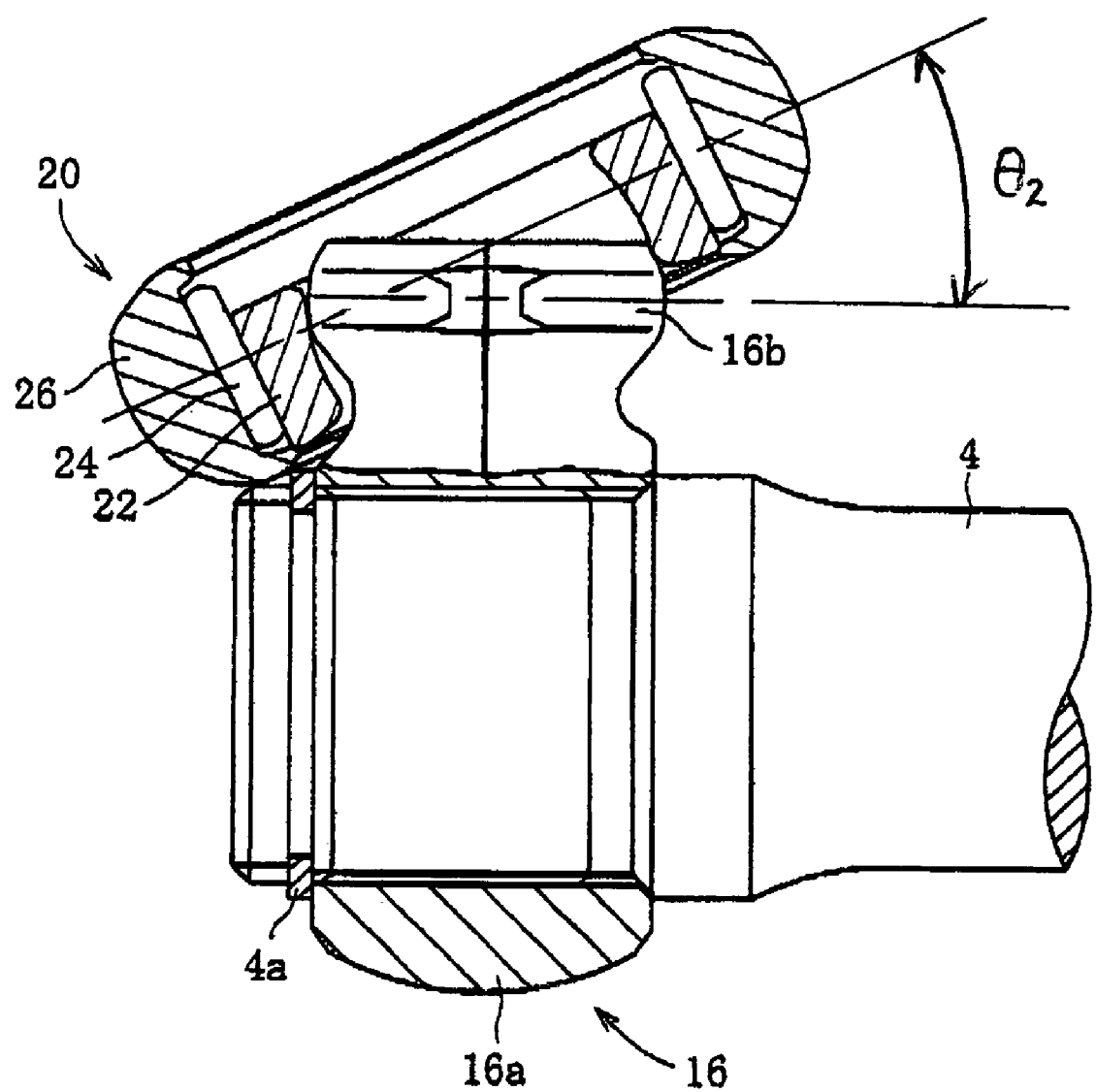
FIG. 11 is a sectional view of the tripod kit.

As shown in FIG. 11, dimensional setting may be such that with $\theta_1$ being an angle at which the inner roller 22 is about to separate from the trunnion journal 16b when the inner roller 22 is being tilted with respect to the trunnion journal 16b, at the point of time when the inner roller 22 takes an angle $\theta_2$ that is slightly smaller than $\theta_1$, the outer roller 26 interferes with the second rotary shaft 4 or the stop ring 4a mounted on the second rotary shaft. Employing such arrangement ensures that in the state of the unit consisting of the tripod 16 and roller assemblies 20, that is, tripod kit, when the tripod 16 is assembled to the second rotary shaft 4 and the stop ring 4a is mounted, the inner roller 22 interferes with the stop ring 4a or the second rotary shaft 4 and cannot tilt up to the angle $\theta_1$ at which it separates from the trunnion journal 16b, so that the tripod kit (16, 20) and the rotary shaft 4 assume a unit handling state, which greatly facilitates handling.

Figure 17A:
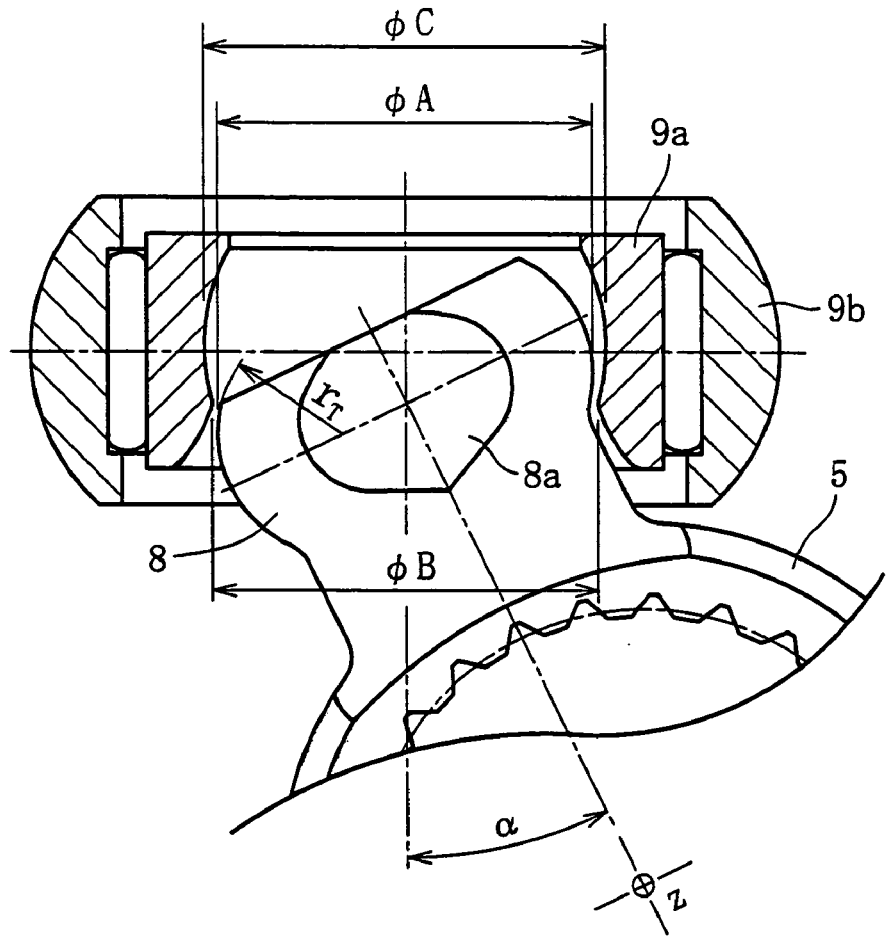
FIG. 17a is a partial sectional view showing the positional relation between the roller and the trunnion journal in the prior art tripod type constant velocity joint.
Figure 17B:
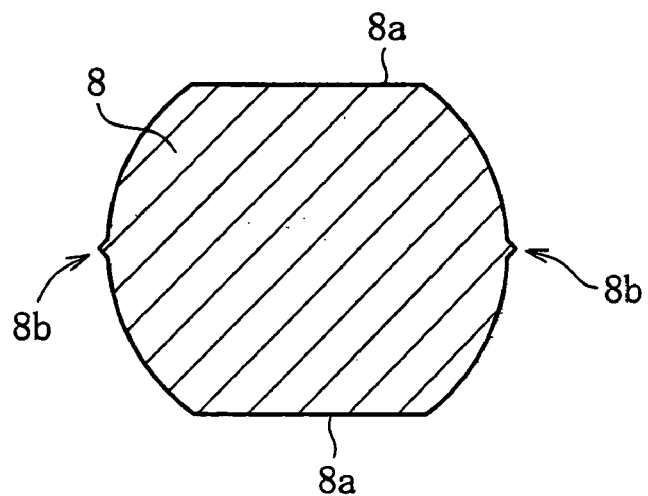
Figure 18:
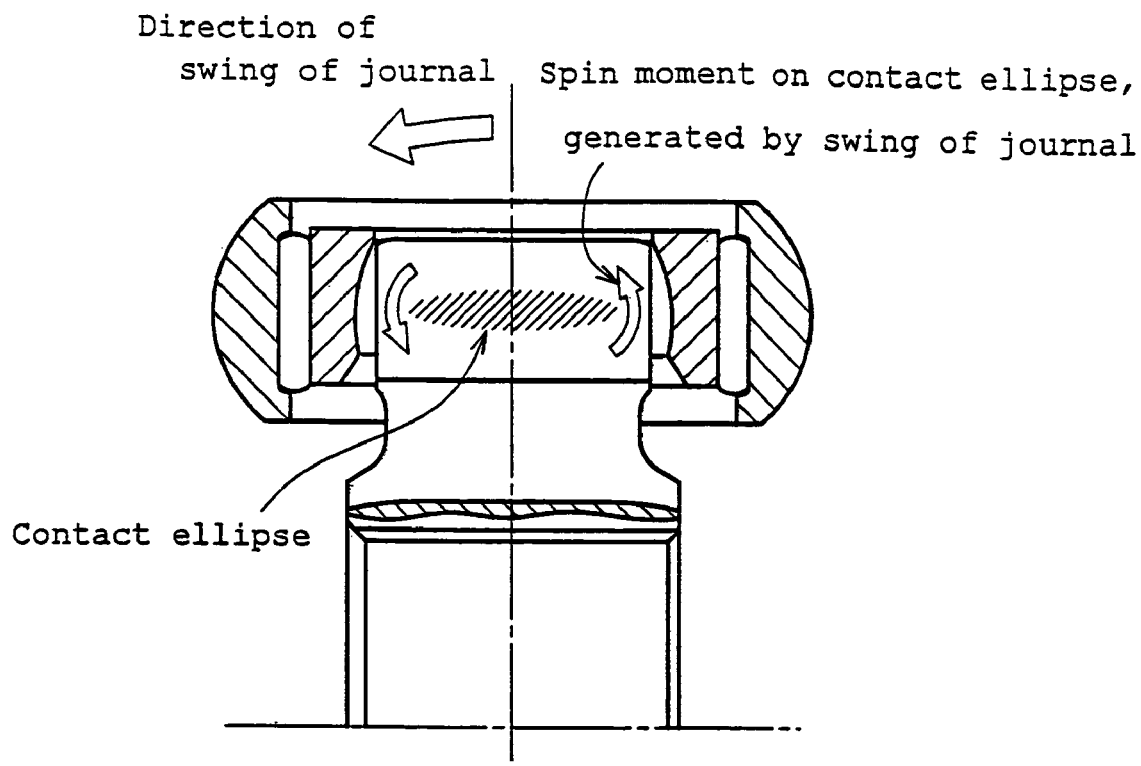
FIG. 18 is a sectional view for explaining a spin moment generated in the prior art tripod type constant velocity joint.
Figure 19:
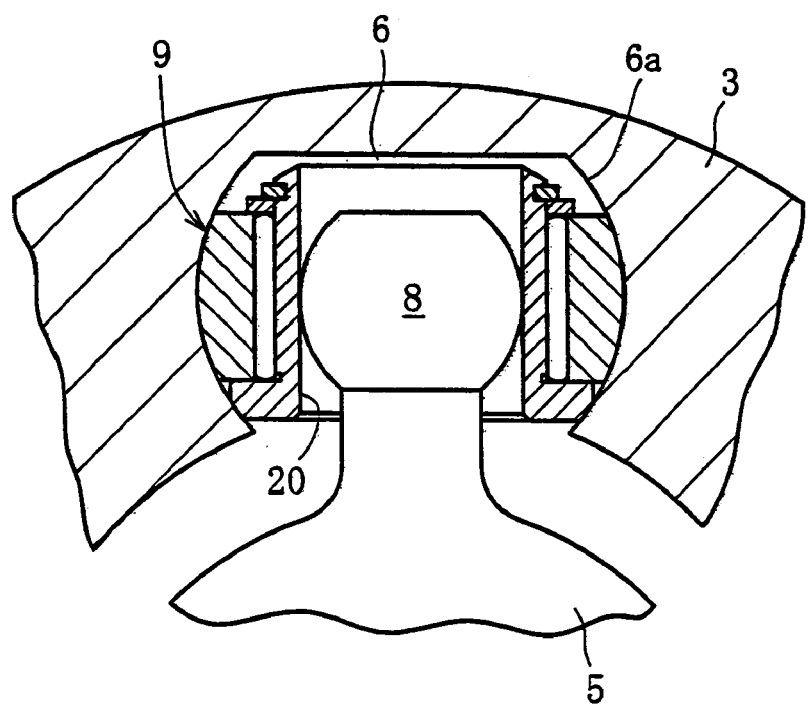
FIG. 19 is a partial sectional view of another prior art tripod type constant velocity joint.

In the prior art joint shown in FIG. 17a, the radius of curvature, $r_T$, of the generating line of the trunnion journal 8 is smaller than the radius A/2 of the trunnion journal 8 so as to establish the relation $\phi A < \phi B$ when the rollers (9a, 9b) are tilted in the circumferential direction of the joint with respect to the trunnion journal 8, and spherical fitting is made possible by proving flat surfaces 8a. In this case, however, there are problems that the radius of curvature, $r_T$, of the trunnion journal 8 has to be decreased with respect to the curvature of the inner spherical surface of the inner roller 9a that spherically fits on the trunnion journal 8 and that the surface pressure increases. The assemblage is made possible by setting the spherical fitting clearance at a large value instead of by reducing the radius of curvature, $r_T$, of the trunnion journal 8. In this case, however, there is a problem that the rotation-directional play of the joint increases. Further, since it is necessary to avoid interference between the root of the trunnion journal disposed circumferentially of the joint subjected to a torque load and the roller, the enlargement of the underhead diameter of the trunnion journal is limited. Furthermore, in applying limit design for size and weight reduction, the root of the trunnion journal disposed circumferentially of the joint subjected to a torque load probably becomes the lowest strength portion of the trunnion journal, so that high strength is difficult to secure. Accordingly, in a tripod type constant velocity joint of high durability type in which surface pressure is reduced by spherical fitting while keeping small the clearance between spherically surface-fitting inner roller and trunnion journal to keep the rotation-directional play small, it is desired to achieve light-weight compaction and cost reduction while securing the trunnion journal underhead strength.

Figure 12A:
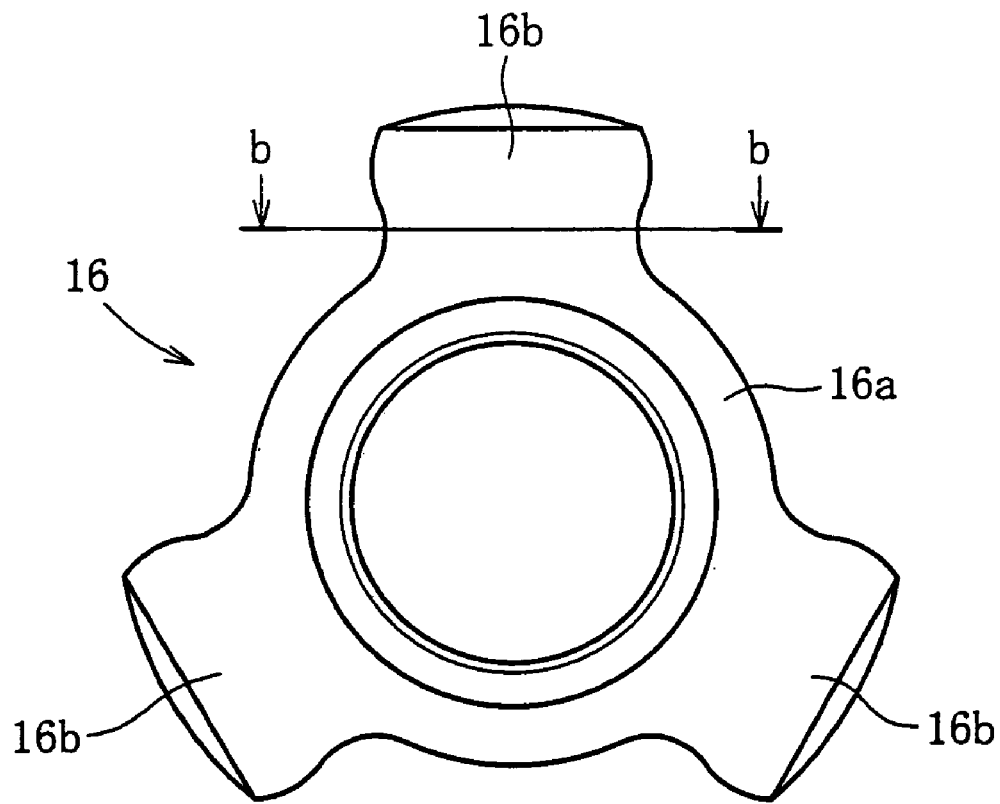
FIG. 12a is a front view of the tripod.
Figure 12B:
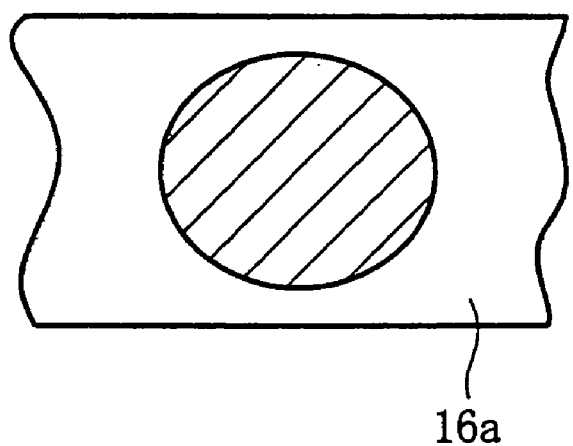

Referring to FIGS. 12a and 12b, the root of the trunnion journal 16b is of non-circular cross-section in which the diameter measured circumferentially of the joint is larger than the diameter measured axially of the joint. FIG. 12b shows an elliptic shape with its minor axis directed axially of the joint as a typical example of a non-circular shape in which the diameter measured circumferentially of the joint is larger than the diameter measured axially of the joint.

FIG. 3 shows how to assemble the roller assembly 20 to the trunnion journal 16b. As shown at 16c in this figure, only the side of boss 16a of the tripod 16 associated with the end of the second rotary shaft 13 (left-hand side end in FIG. 3, right-hand side end in FIG. 2) is heavily chamfered, and the heavy chamfer functions as an interference-avoiding relief between the trunnion journal 16b and the roller assembly 20, making it possible to greatly tilt the roller assembly 20 as shown in phantom line in FIG. 3 when the roller assembly 20 is assembled to the trunnion journal 16b. And since it is at only two opposed places as seen in the torque load acting direction (the direction perpendicular to the plane of the sheet of FIG. 3) that the inner roller 22 of the roller assembly 20 interferes with the trunnion journal 16b, assemblage is made possible by pushing in the inner roller 22 while elastically deforming the same.

In addition, it is essential only that an interference-avoiding relief between the trunnion journal 16b and the roller assembly 20 be present in region of the underhead portion of the trunnion journal disposed axially of the joint; such relief is unnecessary for the region of the trunnion journal underhead portion disposed circumferentially of the joint. With this design specification, since an interference-avoiding relief in the underhead circumferential position tending to be the maximum stress position when subjected to torque load is unnecessary, strength improvement becomes possible and it is possible to provide a more compact tripod type constant velocity joint. Further, flat surfaces may be provided for relief at two places (outside the load range) at right angles with the position subjected to a torque load on the trunnion journal 16b.

According to the above construction, it is possible to provide a tripod type constant velocity joint of high performance type, wherein since torque is transmitted between the spherical inner peripheral surface of the inner roller 22 and the spherical trunnion journal 16b, the contact surface pressure is kept low, a fact which is advantageous for strength and durability, while the underhead strength of the trunnion journal 16b is also improved, and high performance, high strength, high durability, and compaction are all satisfied.

Figure 13:
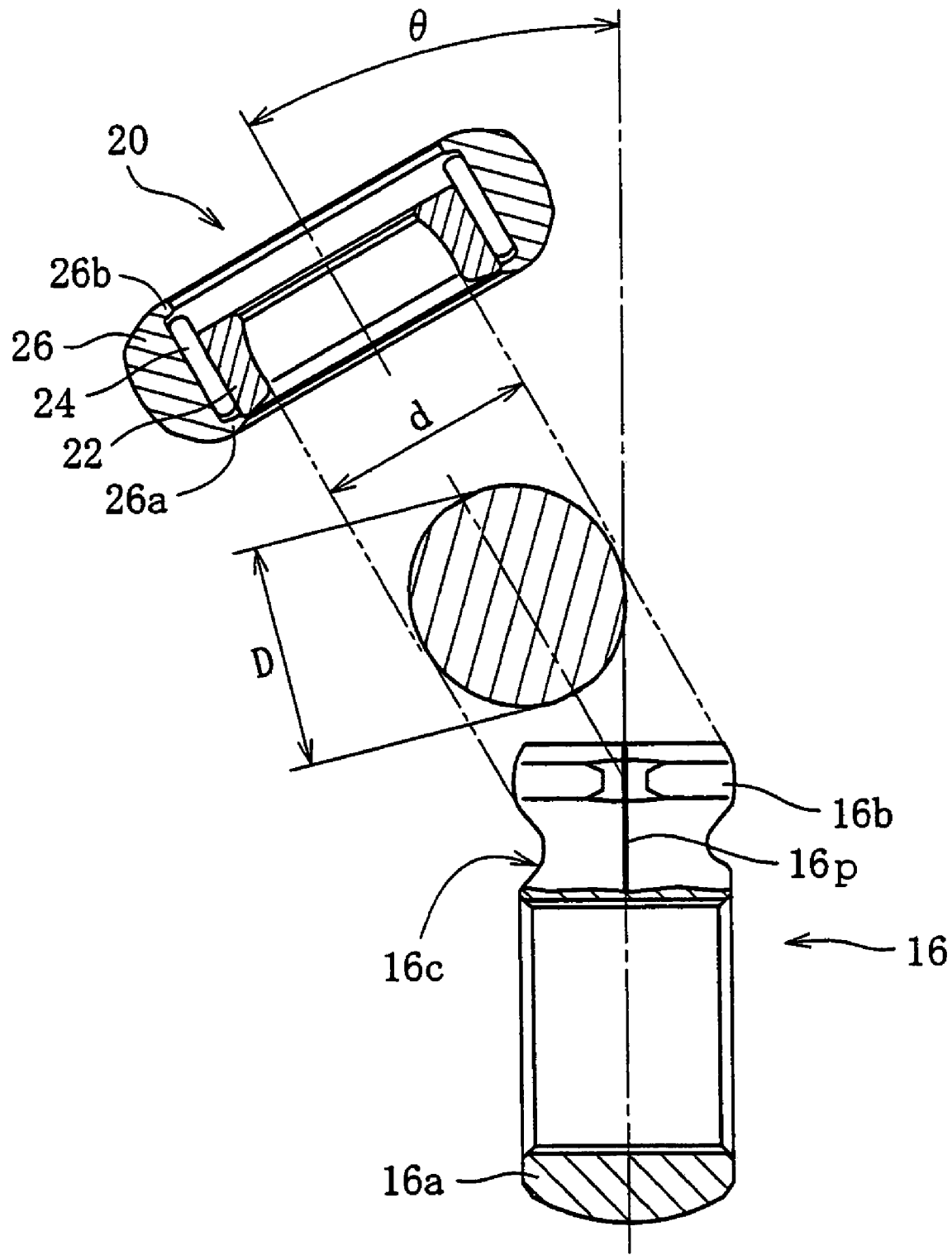
FIG. 13 is an exploded sectional view of a tripod kit similar to that shown in FIG. 3.
Figure 14A:
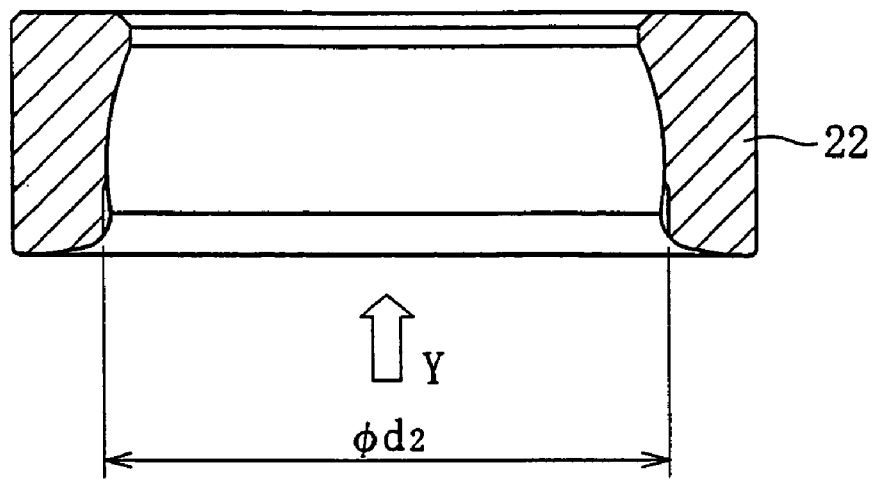
FIG. 14a is a sectional view of the inner roller.
Figure 14B:
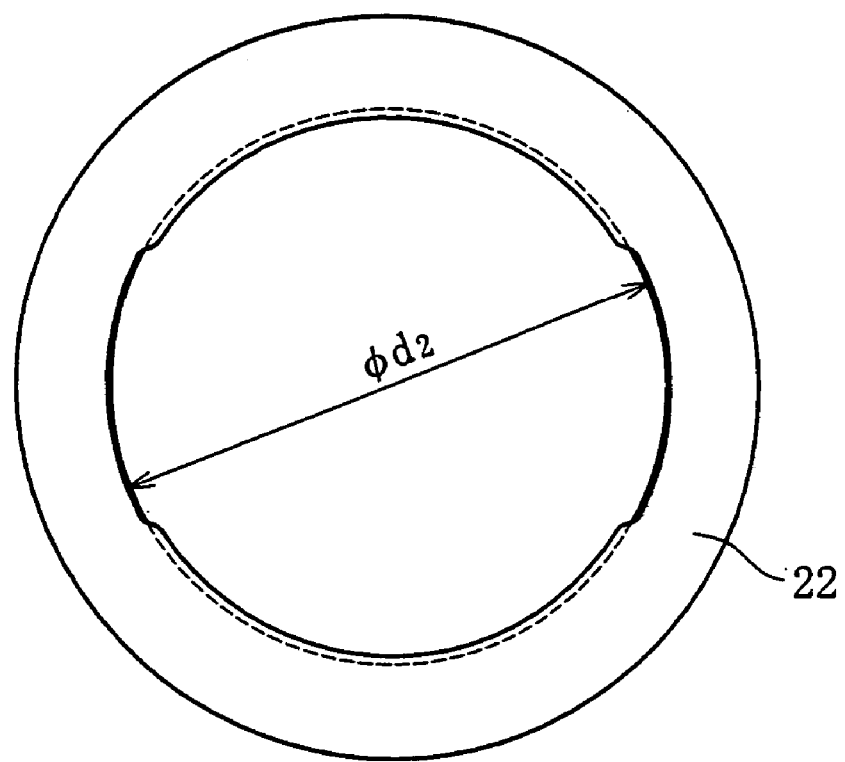

As shown in FIGS. 13, 14a, and 14b, let $\theta$ be the angle at which the inner roller 22 is tilted when assembled to the trunnion journal 16b. Then, the maximum diameter $\phi D$ of the trunnion journal 16b including the protuberance maximum outer diameter portion of the forged parting line 16d as projected in the direction of angle $\theta$ may be set smaller than the fitting insertion side inner diameter $\theta d$ of the inner roller 22. Further, as shown in FIGS. 14a and 14b, a notch is locally formed in the insertion side inner diameter of the inner roller 22. Let $\phi d_2$ the inner diameter of the notch, and $\phi D_2$ be the maximum diameter of the trunnion journal 16b (including the forged parting line 16d) projected in the direction of angle $\theta$. Then, these factors may be set such that $\phi D_2 < \phi d_2$. Thereby, when the roller assembly 20 is to be assembled to the trunnion journal 16b, it is possible to do so without elastically deforming the inner roller 20. Therefore, it becomes possible to dispense with the forged parting line removing step and the pressure-fitting step when the roller assembly 20 is assembled to the trunnion journal 16b.

What is claimed is:

1. A tripod type constant velocity joint comprising a hollow housing fixed to the end of a first rotary shaft and formed with axially extending recessed grooves opened at one axial end and located at circumferentially trisectional positions on the inner peripheral surface, a tripod comprising a boss fixed to the end of a second rotary shaft, and end-spherical trunnion journals radially projecting from circumferentially trisectional positions on the boss, roller assemblies each comprising an inner roller swingably fitted at the inner peripheral surface thereof on the spherical outer peripheral surface of the trunnion journal, and an outer roller supported for rotation and axial movement on the outer peripheral surface of the inner roller through needle rollers, wherein the outer roller is received in the recessed grooves in the housing and is rollable axially of the housing, each recessed groove comprising guide surfaces contacting the outer peripheral surface of the outer roller and subjected to loads and guide shoulder surfaces for guiding the outer roller axially of the housing, and a relief is locally formed along a forged parting line of the trunnion journal, thereby receding a protuberance of the parting line inwardly from the outer peripheral surface of the trunnion journal.

2. A tripod type constant velocity joint as set forth in claim 1, wherein the outer diameter of the boss of the tripod at one axial end thereof is chamfered more heavily than at the other end thereof, thereby preventing the roller assembly from interfering with said boss when the roller assembly is tilted for assemblage to the trunnion journal.

3. A tripod type constant velocity joint as set forth in claim 1, wherein with $\theta$ being an angle at which the roller assembly is tilted for assemblage to the trunnion journal, the maximum diameter of the trunnion journal including the forged parting line projected in the direction of angle $\theta$ is not more than the inner diameter on the inner roller insertion side.

4. A tripod type constant velocity joint as set forth in claim 1, characterized in that a dimensional setting is such that with $\theta_1$ being the angle at which the roller assembly is about to separate from the trunnion journal, the roller assembly interferes with the rotary shaft when it is tilted up to an angle $\theta_2$ ($\theta_2 < \theta_1$) after the rotary shaft has been mounted in the tripod.

* * * * *